United States Patent Office 3,540,323
Patented Nov. 17, 1970

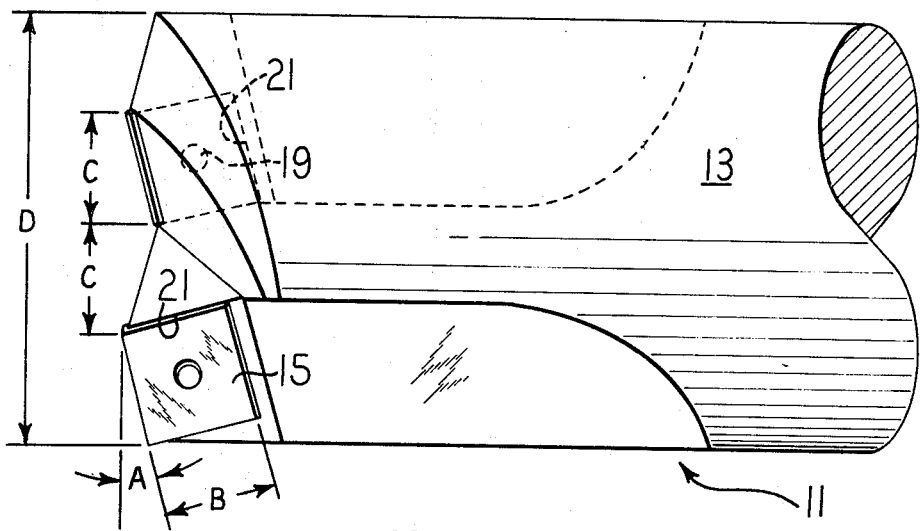
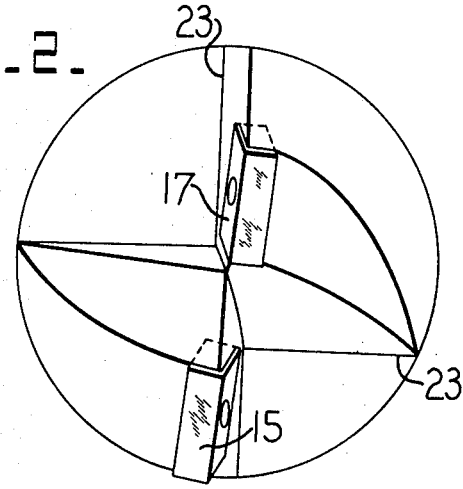
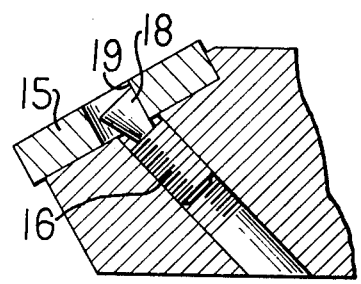
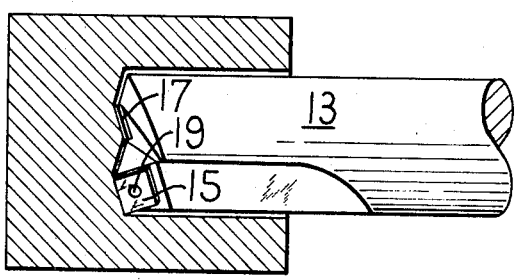
INVENTORS
EVERETT D. RISHEL

3,540,323
DRILL HAVING INDEXABLE CARBIDE INSERTS
Everett D. Rishel, Sugar Grove, Ill., assignor to Caterpillar Tractor Co., Peoria, Ill., a corporation of California
Filed June 17, 1968, Ser. No. 737,510
Int. Cl. B23b 51/00
U.S. Cl. 77—67                                     6 Claims

ABSTRACT OF THE DISCLOSURE

A plurality of replaceable carbide inserts mounted on a high speed cutting tool.

BACKGROUND OF THE INVENTION

This invention relates to a plurality of indexable carbide inserts which may be mounted on drill shanks or other cutting tools with predetermined recess angles in which the inserts are mounted.

Presently available high speed twist drills and other cutting tools are subject to rapid dulling of the cutting edges. This is especially true when cutting through steel castings which often have small sand pockets embedded within the metal. When the cutter encounters one of these sand pockets, extreme wear and cutting edge chipping is often experienced. As a result, the cutter requires frequent sharpening, thereby increasing tool setup time and labor costs. Additionally, this often results in the maintenance of a large tool inventory to assure continuous operation of the machine while previously used tools are being sharpened.

Many previously known tools have proven to be commercially inefficient because either the effective cutting diameter could not be altered or else it could be adjusted only through a relatively complicated insert holder-adjustment device.

It is therefore an object of this invention to provide a carbide cutter insert which may be indexed to various positions within a tool shank before regrinding or disposal of the insert is required.

It is also an object of this invention to provide a high speed drill which may drill holes within a wide range of effective diameters dependent only upon the angular orientation of the drill shank recess.

It is also an object of this invention to provide such a drill having carbide inserts which may be indexed to compensate for wear and may also be mounted in various shanks by rather simple means so as to control the diameter of the bore.

Other objects of the invention will become apparent to those skilled in the art upon perusal of the following description of a preferred embodiment depicted in the drawing which is intended to illustrate, but not to restrict, the scope of the invention.

Other embodiments or equivalents of the invention will be obvious to those skilled in the art without departing from the scope of the invention as defined in the appended claims.

Referring now to the drawings:

FIG. 1 is a side view of an embodiment of a drill according to the invention;

FIG. 2 is an end view of the drill of FIG. 1, taken from the left side thereof;

FIG. 3 is a view illustrating the use of the drill in creating a bore; and

FIG. 4 is a sectional view of an insert holding means.

Referring now to the drawing in greater detail there is shown a drill, generally indicated at 11, having a shank 13 and carbide inserts 15 and 17 which are fixed to the shank by any suitable commercially available means such as a lockscrew 16 having a conical head 18 which acts within apertures 19 of the inserts.

Each of the inserts is seated within a recess 21 which is located on one face of V-shaped grooves 23 which are provided in the shank for efficient chip removal.

As shown in FIG. 3, the insert 15 cuts the material from the outside of the bore to a point equal to one-half the radius of the bore and the insert 17 cuts the material from the center of the bore up to a distance equal to one-half the radius thereof. As shown, the leading corners of each insert move on the same path.

The inserts are positioned to have negative radial and negative axial angles so as to prevent the back edges of the inserts from rubbing on the walls of the bore.

The angle of the cutting edge of the inserts may be changed by fixing the inserts to shanks in which the recesses have been machined at predetermined angles which are distinct from one shank to the next. The following chart, which is not offered as being complete, illustrates how the effective diameter D and radial dimension C of the bore can be varied using the same size (dimension B) insert by varying the angle A of the recess, and thus the cutting edge, from 15° to 45°.

| Angle A | Dimension B | Dimension C | Diameter D |
|---|---|---|---|
| 15° | .375 | .371 | 1.485 |
| 20° | .375 | .359 | 1.436 |
| 25° | .375 | .349 | 1.395 |
| 30° | .375 | .325 | 1.299 |
| 45° | .375 | .265 | 1.061 |
| 15° | .500 | .483 | 1.932 |
| 20° | .500 | .467 | 1.867 |
| 25° | .500 | .453 | 1.812 |
| 30° | .500 | .433 | 1.732 |
| 45° | .500 | .354 | 1.414 |

Therefore, standard size inserts and shanks can be stocked rather than maintaining a large inventory of drills which must be sharpened individually, and the use of commercially available inserts will allow the drilling of a hole having a diameter of up to four inches.

Thus, the applicant has provided a true advancement in the art of drilling tools, since the versatility of drills has been greatly increased while the drill has been simplified. Having described the preferred embodiments of the device, it must be understood that this invention is not to be limited to the precise details shown, but rather to the full range of alterations and equivalents available under the limitations set forth in the following claims.

What is claimed is:

1. A drill comprising a shank having a plurality of grooves therein, each of said grooves having a recess adjacent the end of said drill, a cutting insert mounted in each of said recesses, said cutting inserts each being of the same standard size and shape and having a plurality of cutting edges thereon, each insert being mounted at negative radial and negative axial angles and presenting one leading edge of said plurality of cutting edges on each insert toward the direction of cutting as the drill advances, each of said leading edges being operable to cut material being drilled a radial distance equal to the radius of the hole being drilled, divided by the number of inserts, and wherein means for adjustably holding the inserts are provided whereby each insert may be indexed to present a different one of said plurality of cutting edges toward the direction of drill advance when the cutting edge in the leading edge position becomes worn, said holding means being adapted to allow removal and disposal of an insert after all of its cutting edges have become worn and the replacement by a new insert, thus obviating the necessity of frequent sharpening of the drill.

2. In combination, a drill shank having a pair of grooves therein for chip removal, a recess in the trailing wall of each of said grooves at the leading end of said drill shank, a multi-edged cutting insert in each of said recesses, each insert being identical in size with the other insert and having a plurality of cutting edges thereon, mounting means on said drill for adjustably holding each insert such that each insert will present a single cutting edge to the workpiece along a line equal to one-half the radius of the hole to be drilled and whereby each insert may be indexed to present a different one of the plurality of cutting edges to the workpiece as each preceding cutting edge becomes worn, said recesses in said grooves being so formed as to present the cutting edge of each insert to the workpiece at a predetermined radial angle and thereby determine the effective cutting diameter of the drill.

3. In a drill shank, a pair of grooves, recesses in said grooves at the leading end of said shank, a cutting insert in each of said grooves, said inserts being square in shape and of uniform size, the edges defined by said square shape having cutting edges thereon, means for adjustably holding said inserts whereby said inserts present leading cutting edges equal to one-half the effective cutting diameter of the drill, each of said inserts presenting a leading cutting edge equal to one-quarter of the effective cutting diameter of the drill, said means for adjustably holding said inserts being mounted in each recess, and centered apertures in said inserts cooperating with said holding means whereby each insert may be indexed to present a new cutting edge as the leading cutting edge becomes worn, said holding means being adapted to allow removal and disposal of an insert after all of its cutting edges have become worn and replacement by a new insert, thus obviating the necessity of frequent sharpening of the drill.

4. The combination of claim 2 wherein said grooves are positioned diametrically opposite each other on said drill shank and wherein one of said inserts is mounted at the radially innermost part of its groove such that said one insert removes material from the workpiece between the drill center and a point one-fourth the effective diameter of the drill from the center and wherein the other of said inserts is mounted at the radially outermost part of is groove such that said other insert removes material from the workpiece between a point one-fourth the effective diameter of the drill and a point one-half the effective diameter of the drill from the center.

5. The combination of claim 4 wherein the radial angle at which said inserts are mounted is a negative angle such that the radially innermost point on the cutting edge of the radially outermost insert is axially advanced with respect to the radially outermost point on the cutting edge of said radially outermost insert whereby said radially outermost point determines the effective cutting diameter of the drill, and such that the radially outermost point on the cutting edge of the radially innermost insert is axially advanced with respect to the radially innermost point on the cutting edge of said radially innermost insert.

6. The combination of claim 5 wherein said inserts are additionally mounted at a negative axial angle in order to prevent the inserts from rubbing on the walls of the hole drilled by said drill.

References Cited

UNITED STATES PATENTS

| | | | |
|---|---|---|---|
| 3,341,919 | 9/1967 | Lovendahl | 29—96 |
| 3,274,863 | 9/1966 | Faber | 77—67 |
| 3,203,493 | 8/1965 | Bergstrom | 77—67 |
| 313,405 | 3/1885 | Davis | 77—69 |

FRANCIS S. HUSAR, Primary Examiner

U.S. Cl. X.R.

29—96